United States Patent
Lu et al.

(10) Patent No.: US 11,005,403 B2
(45) Date of Patent: May 11, 2021

(54) MOTOR CONTROL SYSTEM AND METHOD BASED ON CURRENT FEEDBACK SIGNAL

(71) Applicant: AAC Technologies Pte. Ltd., Singapore (SG)

(72) Inventors: Xiang Lu, Shenzhen (CN); Zheng Xiang, Shenzhen (CN); Liang Jiang, Shenzhen (CN); Hanlin Deng, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 32 days.

(21) Appl. No.: 16/528,682

(22) Filed: Aug. 1, 2019

(65) Prior Publication Data
US 2020/0052636 A1 Feb. 13, 2020

(30) Foreign Application Priority Data
Aug. 9, 2018 (CN) .......................... 201810902216.5

(51) Int. Cl.
*H02P 25/032* (2016.01)
*H02P 23/00* (2016.01)

(52) U.S. Cl.
CPC ........ *H02P 25/032* (2016.02); *H02P 23/0009* (2013.01)

(58) Field of Classification Search
CPC .................... G05B 13/00; G05B 11/36; G05B 2219/42162; G05B 2219/42343; G05B 23/0254; G05B 2219/39355; G05B 2219/41367; G06F 7/60; H02P 25/032; H02P 23/0009
See application file for complete search history.

(56) References Cited

U.S. PATENT DOCUMENTS

| 2016/0209815 A1* | 7/2016 | Blevins .................. G05B 13/02 |
| 2017/0256145 A1* | 9/2017 | Macours .............. H04N 5/2257 |
| 2018/0175765 A1* | 6/2018 | Ishikawa ................ H02P 21/22 |

* cited by examiner

*Primary Examiner* — Said Bouziane
(74) *Attorney, Agent, or Firm* — W&G Law Group LLP (57) ABSTRACT

The present disclosure relates to a motor control system and method based on current feedback signal. The motor control system includes a control apparatus, a linear motor, and a current feedback apparatus, where an output end of the control apparatus is connected to the linear motor for calculating a displacement error of a previous moment to obtain a control output value of a current moment, and converting the control output value into a voltage signal for transmission to the linear motor; the linear motor is configured to vibrate according to the voltage signal input by the control apparatus; and the current feedback apparatus is connected to the linear motor, and is configured to: convert a measured current value of the linear motor into an actual displacement value of the current moment, and feed back the actual displacement value to an input end of the control apparatus.

7 Claims, 5 Drawing Sheets

MOTOR CONTROL SYSTEM AND METHOD BASED ON CURRENT FEEDBACK SIGNAL

TECHNICAL FIELD

Implementations of the present disclosure relate to the field of automation control technologies, and in particular, to a motor control system and method based on current feedback signal.

BACKGROUND

A linear vibration motor, also known as a linear resonant actuator ("LRA" for short), is also usually referred to as a linear motor. As linear motors become increasingly popular in the fields of smart phones, tablet computers and the like, how to effectively control vibration of linear motors becomes very important. The linear motor usually includes a proportion integration differentiation controller ("PID" controller for short), which consists of a proportion unit P, an integration unit I and a differentiation unit D, and is used in an industrial production process. Processing variables such as temperature, pressure, flow, and liquid level of a production apparatus are usually required to be maintained at a particular value or change according to a particular law, to meet the requirement of the production process. The deviation of the entire control system is adjusted according to the PID control principle, so that the actual values of the controlled variables are consistent with the predetermined values of the process requirement. Different control laws are applicable to different production processes, and corresponding control laws need to be suitably selected. Otherwise, the PID controller will not achieve the expected control effect.

However, the inventor of the present disclosure finds that, in the prior art, motor vibration is controlled specifically by using a preset motor excitation signal. Consequently, a motor state cannot be tracked in real time, and the motor cannot be accurately controlled, and an uncontrollable consequence is caused in a severe case.

DETAILED DESCRIPTION

To make the objectives, technical solutions, and advantages of the implementations of the present disclosure clearer, the following further describes implementations of the present disclosure in detail with reference to the accompanying drawings. However, a person of ordinary skill in the art can understand that in each implementation of the present disclosure, to make readers better understand the present disclosure, many technical details are provided. However, even though there are no technical details and various variations and modifications based on the following implementations, the technical solutions claimed in the present disclosure can also be implemented.

A first implementation of the present disclosure relates to a motor control system based on current feedback signal. The core of this implementation lies in that the motor control system based on current feedback signal including: a control apparatus, a linear motor, and a current feedback apparatus, where an output end of the control apparatus is connected to the linear motor, the control apparatus is configured for calculating a displacement error of a previous moment to obtain a control output value of a current moment, and converting the control output value into a voltage signal for transmission to the linear motor; the linear motor is configured to vibrate according to the voltage signal input by the control apparatus; and the current feedback apparatus is connected to the linear motor, and is configured to: convert a measured current value of the linear motor into an actual displacement value of the current moment, and feed back the actual displacement value to an input end of the control apparatus. By using a closed-loop control technology of feeding back the actual displacement value equivalent to the current value of the linear motor to the input end, the linear motor control system based on current feedback signal in the present disclosure can dynamically track the state of the linear motor by using the actual displacement value fed back to the input end of the control apparatus, and can adjust the input signal in real time, so that the system can effectively track a motion trajectory change caused by factors such as an environmental change. In this way, when the motion state of the linear motor changes, the input signal can be quickly adjusted, so that the linear motor always keeps a preset good state, to facilitate improvement of the accuracy of controlling the motor, thereby avoiding causing an uncontrollable consequence.

The following specifically describes implementation details of a current feedback signal based motor control system, and the following content is merely implementation details provided for ease of understanding, and is not necessary for implementation of this solution.

Figure 1:
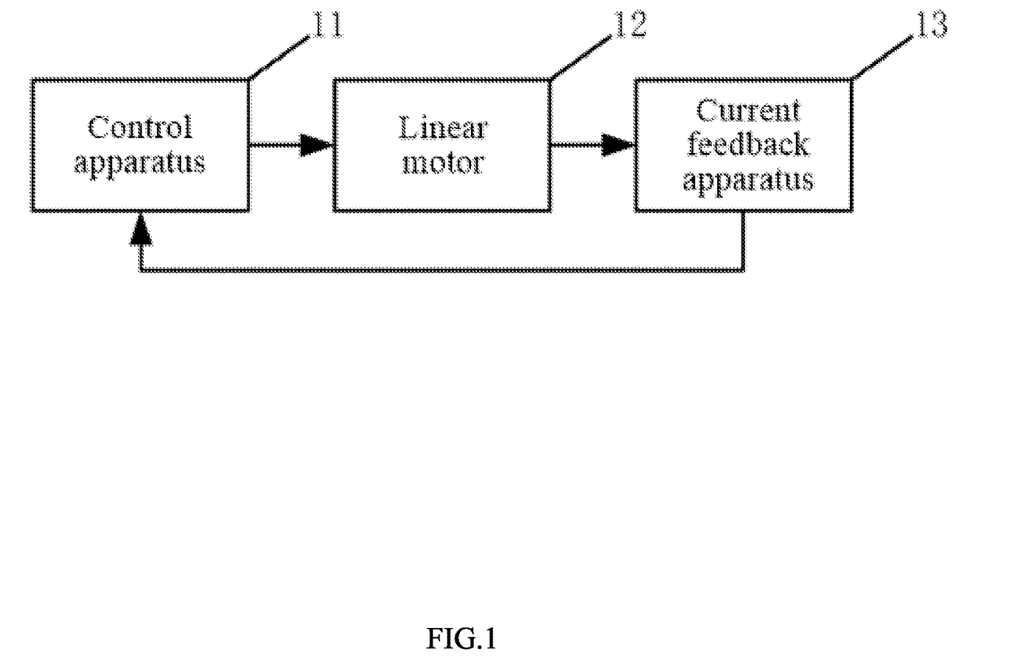
FIG. 1 is a schematic diagram of a structural connection of a motor control system based on current feedback signal according to a first implementation of the present disclosure.

A schematic diagram of a structural connection of a motor control system based on current feedback signal in this implementation is shown in FIG. 1, and the motor control system based on current feedback signal includes: a control apparatus 11, a linear motor 12, and a current feedback apparatus 13.

An output end of the control apparatus 11 is connected to the linear motor 12 for calculating a displacement error of a previous moment to obtain a control output value of a current moment, and converting the control output value into a voltage signal for transmission to the linear motor 12. The linear motor 12 is configured to vibrate according to the voltage signal input by the control apparatus 11. The current feedback apparatus 13 is connected to the linear motor 12, and is configured to: convert a measured current value of the linear motor 12 into an actual displacement value of the current moment, and feed back the actual displacement value to an input end of the control apparatus 11.

For example, at a moment k, a displacement error err(k−1) is obtained by subtracting an input signal s(k−1) at a moment k−1 from a displacement value x(k−1) at the moment k−1, and then a displacement control output value ctrl(k) is obtained through calculation by using the PID controller 110. After displacement-voltage conversion is performed on ctrl(k), a control input voltage signal u(k) is obtained. After u(k) is input into the linear motor 12, a readback current i(k) at this moment is obtained. After current-displacement conversion is performed on i(k), an actual displacement value x(k) at the moment k is obtained. The foregoing steps are repeatedly performed until the input signal is 0.

Figure 2:
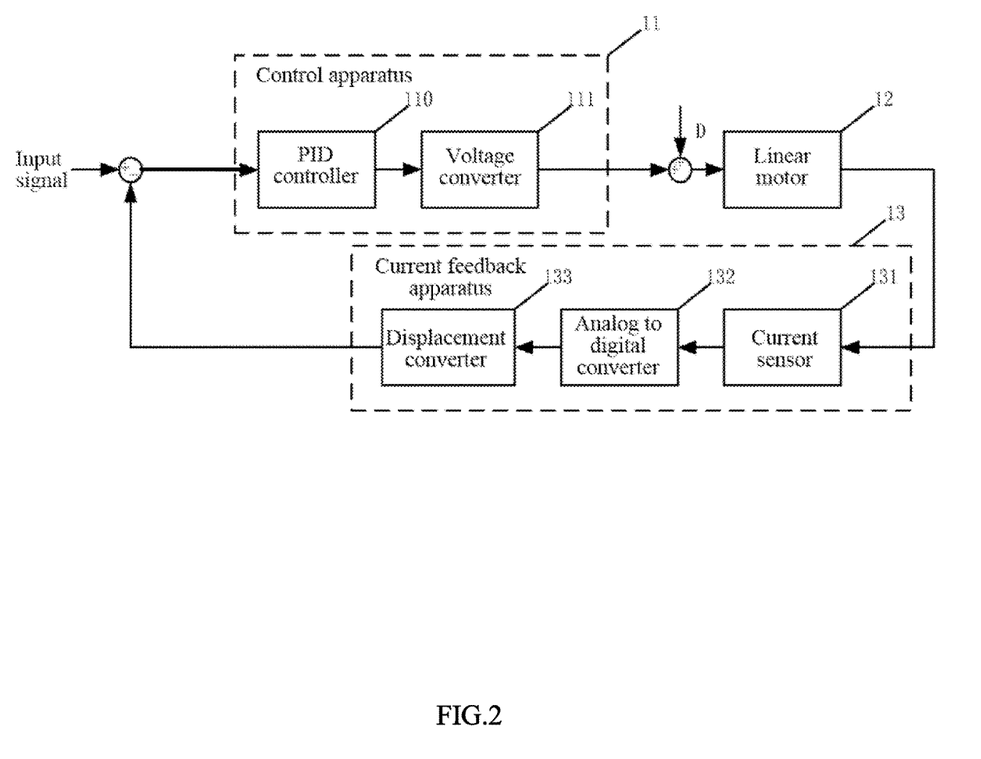
FIG. 2 is a schematic diagram of a structural connection of a specific implementation of a motor control system based on current feedback signal according to the first implementation of the present disclosure.

FIG. 2 is a specific implementation of the motor control system in this implementation. The circle in FIG. 2 represents linear accumulation, and D represents interference, and they are not necessary for implementing the technical solution of the present disclosure.

Specifically, the control apparatus 11 may include: a PID controller 110 and a voltage converter 111 connected in series to the PID controller 110; the PID controller 110 is configured to perform PID calculation according to the displacement error of the previous moment, to obtain the control output value of the current moment; and the voltage converter 111 is configured to: convert the control output value from a displacement value into the voltage signal, and transmit the voltage signal to the linear motor 12. That is, the PID controller 110 performs PID calculation by using an error, to obtain a control output of a next moment that can eliminate the displacement error of the current moment. Because the PID controller 110 is single input and single output, and the control output value is output as a displacement value, the displacement value needs to be converted, by using the voltage converter 111 connected in series to the PID controller 110; into a voltage signal which can be directly used in the linear motor 12. Conversion of the control output value from the displacement value into the voltage signal may be solved by using the following differential equation:

$$\frac{Bl}{R} \cdot u = m\ddot{x} + c\dot{x} + kx;$$

in which B1 is an electromagnetic force coefficient, R is resistance, and m, c, and k are motor system related coefficients.

The current feedback apparatus may include: a current sensor 131, an analog to digital converter 132, and a displacement converter 133; the current sensor 131 is connected to the linear motor 12, for measuring current values on two ends of the linear motor 12; the analog to digital converter 132 is connected to the current sensor 131, for converting an electrical signal of the current sensor 131 into a digital signal; and the displacement converter 133 is connected to the analog to digital convertor 132, for converting the digital signal into the actual displacement value of the current moment. The displacement value cannot be directly measured when the motor vibrates and only current values on two ends of the motor can be obtained. Therefore, the current value of the motor at this moment needs to be converted into an equivalent actual displacement value, and the actual displacement value is input to the PID controller 110 for error calculation and control. Conversion of the current value of the motor at this moment into the equivalent actual displacement value, may be solved according to a transfer function of a motor system, namely:

$$\frac{x(s)}{i(s)} = Bl \cdot \frac{1}{ms^2 + cs + k};$$

in which B1 is the electromagnetic force coefficient, m, c, and k are the motor system related coefficients, x(s) is the actual displacement value, and i(s) is the current value of the motor at this moment.

It should be noted that the current detection apparatus may further include, but not limited to, an apparatus that obtains current by using a precision resistor and voltages on two ends thereof.

Preferably, the PID controller 110 is specifically configured to: when the displacement error of the previous moment is greater than a preset threshold, perform proportional-differential calculation, to obtain the control output value of the current moment; and when the displacement error of the previous moment is less than the preset threshold, perform proportional-integral-differential calculation, to obtain the control output value of the current moment. By making the calculation manner when the displacement error of the previous moment is greater than the preset threshold different from the calculation manner when the displacement error of the previous moment is less than the preset threshold, namely, through integral separation control, avoidance of an excessively large overshoot is facilitated. Namely, steps of implementing integral separation may include: setting a threshold a>0; when the displacement error |error (k)| of the previous moment satisfy |error(k)|>a, using PD control; and when the displacement error |error(k)| of the previous moment satisfy |error(k)|<a, using HD control.

Specifically, the PID controller 110 consists of a proportion unit (p), an integration unit (i), and a differentiation unit (d). A relationship between input e(t) and output u(t) thereof is:

$$u(t) = K_p e(t) + K_i \int_0^t e(t)dt + K_d \frac{de(t)}{dt};$$

in which upper and lower limits in the formula are 0 and t, respectively.

Proportional control is one of the simplest control methods. The output error signal of the PID controller 110 is proportional to the input error signal of the PID controller 110. There is a steady state error in system output when there is only proportional control. In integral control, integration of the output error signal of the PID controller 110 is directly proportional to integration of the input error signal of the PID controller 110. For an automatic control system, if there is a steady state error after entering the steady state, the control system is said to have a steady state error or is briefly referred to as a system with an error. To eliminate the steady state error, an "integral term" needs to be introduced into the controller. The error of the integral term depends on integration of time, and as time increases, the integral term increases. In this way, even if the error is small, the integral term will increase with time, and push output of the controller to increase, so that the steady state error is further reduced until the steady state error is equal to zero.

In differentiation control, differentiation (namely, a change rate of the error) of the output error signal of the PID controller 110 is directly proportional to differentiation of the input error signal of the PID controller 110. The automatic control system may oscillate or even destabilize in the adjustment process of overcoming an error. The reason is that there is a large inertia link or lag, which has the effect of suppressing the error, and the change thereof always lags behind the error change. The solution is to make the change of the effect of suppressing the error "leading". That is, when the error is close to zero, the effect of suppressing the error should be zero. That is, it is usually not enough to introduce only the "proportional" term into the controller. The effect of the proportional term is merely to amplify the amplitude of the error, and a "differential term" needs to be added, which can predict the trend of the change of the error. In this way, a controller with proportion and differentiation can make the control effect of suppressing the error equal to zero or even a negative value in advance, thereby avoiding the severe overshoot of the controlled variable.

Preferably, the PID controller 110 is further configured to: determine whether the control output value of the current moment exceeds a limiting range after calculating the control output value of the current moment, and if yes, accumulate a deviation value to the control output value. By using an integral anti-saturation structure that accumulates a deviation value to the control output value, prevention of flapping caused by excessive control over the PID controller 110 is facilitated.

The limiting range specifically includes a positive deviation range and a negative deviation range; and the PID controller 110 is specifically configured to accumulate a negative deviation value to the control output value when the control output value exceeds the positive deviation range, and is further configured to accumulate a positive deviation value to the control output value when the control output value exceeds the negative deviation range. To be specific, integral anti-saturation is: when the control output value of the next moment is calculated, it is determined first whether the control output value of the current moment exceeds the limiting range, and if the control output value of the current moment exceeds the positive deviation range, only the negative deviation value is accumulated, and if the control output value of the current moment exceeds the negative deviation range, only the positive deviation value is accumulated. The limiting range herein is the size of a pitch that an oscillator can excite, or a voltage may be applied. In this case, the limiting range is the maximum range of current.

Compared with the prior art, a motor control system based on current feedback signal provided in this implementation of the present disclosure includes: a control apparatus, a linear motor, and a current feedback apparatus, where an output end of the control apparatus is connected to the linear motor, the control apparatus is configured for calculating a displacement error of a previous moment to obtain a control output value of a current moment, and converting the control output value into a voltage signal for transmission to the linear motor; the linear motor is configured to vibrate according to the voltage signal input by the control apparatus; and the current feedback apparatus is connected to the linear motor, and is configured to: convert a measured current value of the linear motor into an actual displacement value of the current moment, and feed back the actual displacement value to an input end of the control apparatus. By using a closed-loop control technology of feeding back the actual displacement value equivalent to the current value of the linear motor to the input end, the linear motor control system based on current feedback signal in the present disclosure can dynamically track the state of the linear motor by using the actual displacement value fed back to the input end of the control apparatus, and can adjust the input signal in real time, so that the system can effectively track a motion trajectory change caused by factors such as an environmental change. In this way, when the motion state of the linear motor changes, the input signal can be quickly adjusted, so that the linear motor always keeps a preset good state, to facilitate improvement of the accuracy of controlling the motor, thereby avoiding causing an uncontrollable consequence.

A second implementation of the present disclosure relates to a motor control system based on current feedback signal. The second implementation makes further improvement based on the first implementation, and the specific improvement lies in that, in the second implementation of the present disclosure, the motor control system based on current feedback signal further includes a prediction compensator; the prediction compensator is reversely connected in parallel to the control apparatus, and is configured to perform delay compensation on the displacement error of the previous moment that is input into the PID controller. By compensating for a delay by using the prediction compensator, reduction of a displacement error is facilitated, and the accuracy of controlling a motor is improved.

Figure 3:
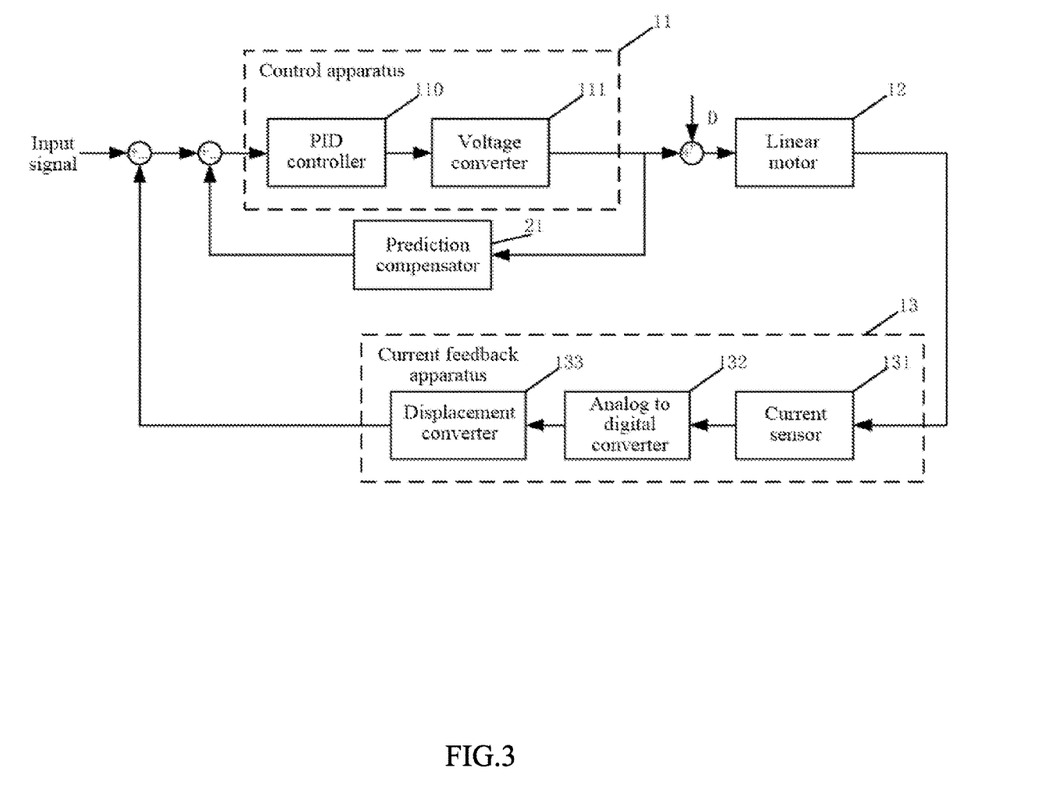
FIG. 3 is a schematic diagram of structural connection of a motor control system based on current feedback signal according to a second implementation of the present disclosure.

Specifically, referring to FIG. 3, the prediction compensator 21 is reversely connected in parallel to the control apparatus, and is configured to perform delay compensation on the displacement error of the previous moment that is input into the PID controller. That is, because the vibration frequency of the linear motor is usually high, making an equivalent time constant small, a large pure delay occurs in a connection between elements of a general motor control system. A person skilled in the art can understand that the delay has great influence on the entire motor control system, and the prediction compensator 21 is reversely connected in parallel to the control apparatus, to perform prediction compensation on the delay of the motor control system based on current feedback signal in this implementation of the present disclosure.

For example, at a moment k, a displacement error err(k−1) is obtained by subtracting an input signal s(k−1) at a moment k−1 from a displacement value x(k−1) at the moment k−1, then delay compensation is performed on the error to obtain e(k−1), and then a displacement control output value ctrl(k) is obtained through calculation by using the PID controller. After displacement-voltage conversion is performed on ctrl(k), a control input voltage signal u(k) is obtained. After u(k) is input into the linear motor, a readback current i(k) at this moment is obtained. After current-displacement conversion is performed on i(k), an actual displacement value x(k) at the moment k is obtained. The foregoing steps are repeatedly performed until the input signal is 0.

Figure 4:
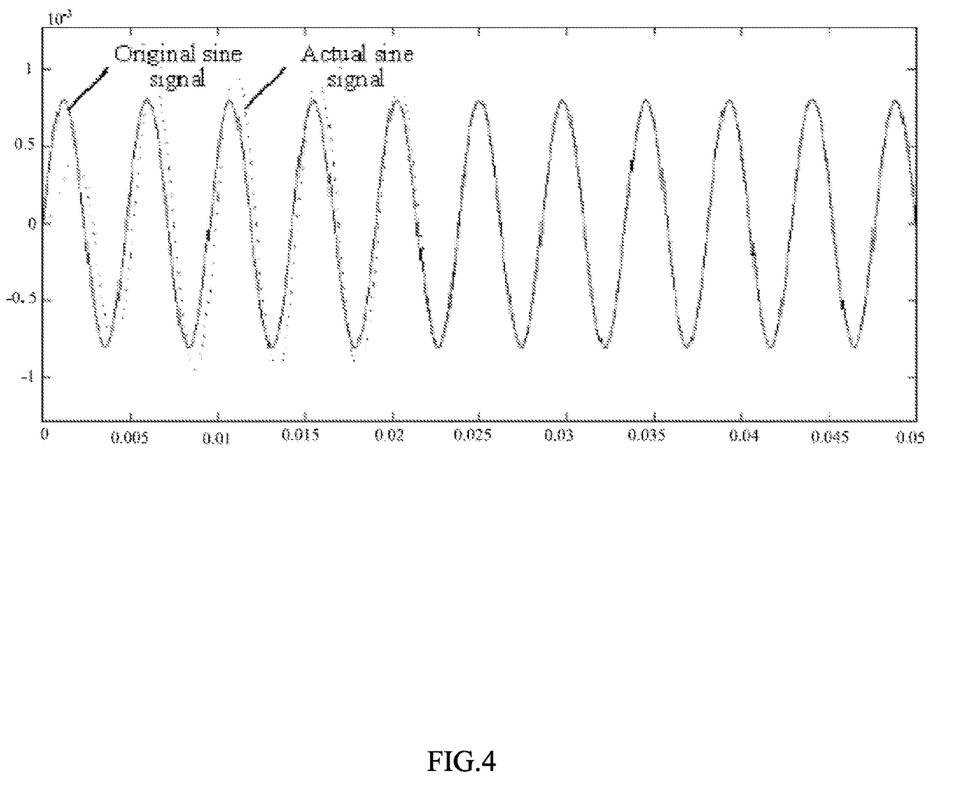
FIG. 4 is an effect diagram of a motor control system based on current feedback signal according to the second implementation of the present disclosure.

An effect diagram of the motor control system based on current feedback signal in this implementation is shown in FIG. 4. FIG. 4 specifically shows a relatively high frequency sine wave tracking result with a delay of 1 ms. An original sine signal (shown by the solid line) may be regarded as a motion trajectory of an oscillator, and an actual sine signal (shown by the dashed line) may be regarded as an actual motion trajectory of a controlled oscillator, and both represent displacement values.

Preferably, the prediction compensator 21 is specifically a Smith predictor. Because the Smith predictor can resist a relatively large delay, use of the Smith predictor facilitates avoidance of an uncontrollable consequence caused by a large delay.

In general, the Smith predictor can compensate for the system uncontrollability caused by a large time delay. The principle thereof is to construct an equivalent motor system and compensate for a transmission delay of the system in advance. A form of expression thereof may be:

$$G(p)=G(s)\cdot(1-e^{-\tau s});$$

in which G(s) is a transfer function of an actual motor, and τ is a transmission delay time of the system.

Compared with the prior art, a motor control system based on current feedback signal provided in this implementation of the present disclosure further includes a prediction compensator, where the prediction compensator is reversely connected in parallel to the control apparatus, and is configured to perform delay compensation on the displacement error of the previous moment that is input into the PID controller. By compensating for a delay by using the prediction compensator, reduction of a displacement error is facilitated, and the accuracy of controlling a motor is improved.

It is worth mentioning that the modules involved in this implementation are all logical modules. In actual application, one logical unit may be one physical unit, or may be a part of one physical unit, or may be implemented as a combination of a plurality of physical units. In addition, to highlight the innovative part of the present disclosure, in this implementation, units not closely related to resolving the technical problem proposed in the present disclosure are not introduced, but this does not mean that there are no other units in this implementation.

A third implementation of the present disclosure relates to a motor control method based on current feedback signal, applied to the motor control system based on current feedback signal in the first implementation or the second implementation, including: calculating a displacement error of a previous moment to obtain a control output value of a current moment, and converting the control output value into a voltage signal for the linear motor to vibrate according to the voltage signal; measuring a current value of the linear motor, and converting the current value into an actual displacement value of the current movement; and feeding back the actual displacement value of the current moment to an input end.

Figure 5:
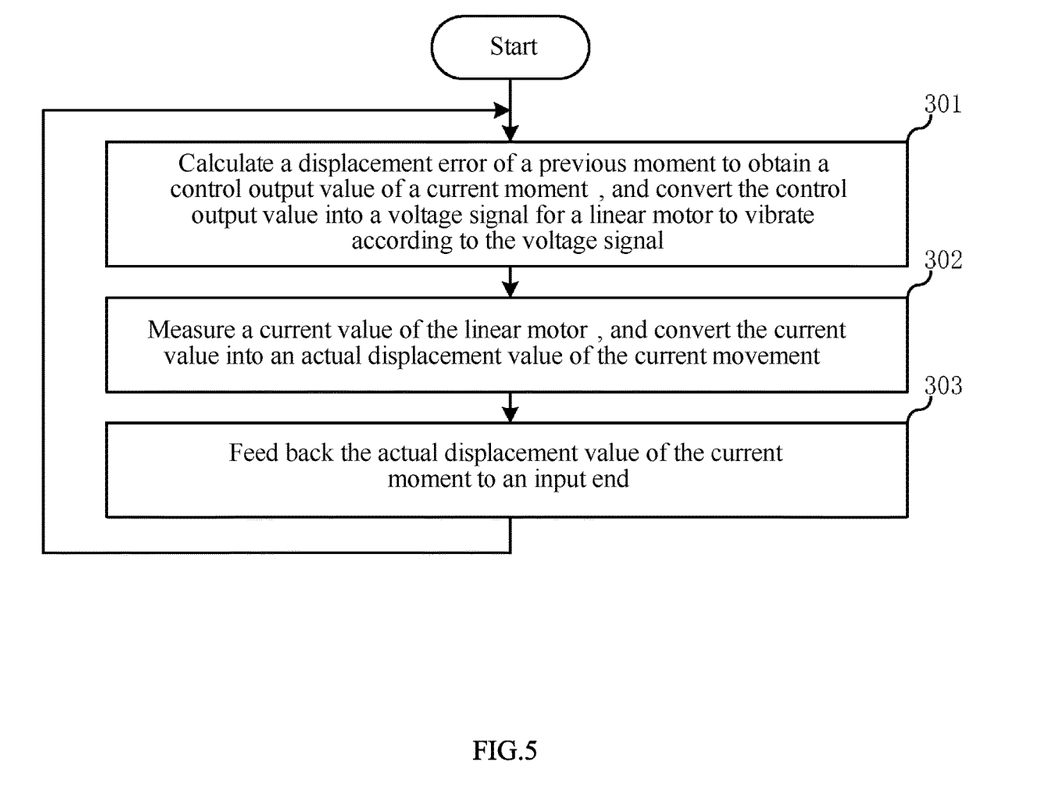
FIG. 5 is a flowchart of a motor control method based on current feedback signal according to a third implementation of the present disclosure.

A flowchart of the motor control method based on current feedback signal in this implementation is shown in FIG. 5, and the method includes:

Step 301: Calculate a displacement error of a previous moment to obtain a control output value of a current moment, and convert the control output value into a voltage signal for the linear motor to vibrate according to the voltage signal.

Step 302: Measure a current value of the linear motor, and convert the current value into an actual displacement value of the current movement.

Step 303: Feed back the actual displacement value of the current moment to an input end.

Compared with the prior art, a motor control method based on current feedback signal provided in this implementation of the present disclosure includes calculating a displacement error of a previous moment to obtain a control output value of a current moment, and converting the control output value into a voltage signal for the linear motor to vibrate according to the voltage signal; measuring a current value of the linear motor, and converting the current value into an actual displacement value of the current movement; and feeding back the actual displacement value of the current moment to an input end. By using a closed-loop control technology of feeding back the actual displacement value equivalent to the current value of the linear motor to the input end, the linear motor control system based on current feedback signal in the present disclosure can dynamically track the state of the linear motor by using the actual displacement value fed back to the input end, and can adjust the input signal in real time. In this way, when the motion state of the linear motor changes, the input signal can be quickly adjusted, so that the linear motor always keeps a preset good state, to facilitate improvement of the accuracy of controlling the motor, thereby avoiding causing an uncontrollable consequence.

It is not difficult to find that this implementation is a method embodiment corresponding to the first implementation. This implementation can be implemented in cooperation with the first implementation. Relevant technical details mentioned in the first implementation are still effective in this implementation. To reduce repetition, details are not described herein again. Correspondingly, relevant technical details mentioned in this implementation can also be applied to the first implementation.

A person of ordinary skill in the art can understand that the foregoing implementations are specific implementations for implementing the present disclosure. However, in actual application, various variations may be made to the implementations in forms and details without departing from the spirit and scope of the present disclosure.

What is claimed is:
1. A motor control system based on electric current feedback signal, comprising a control apparatus, a linear motor, and an electric current feedback apparatus, wherein
  an output end of the control apparatus is connected to the linear motor, the control apparatus configured for calculating a displacement error of a previous moment to obtain a control output value of a current moment, and converting the control output value into a voltage signal for transmission to the linear motor;
  the linear motor is configured to vibrate according to the voltage signal input by the control apparatus; and
  the electric current feedback apparatus is connected to the linear motor, and configured to:
    convert a measured electric current value of the linear motor into an actual displacement value of the current moment, and feedback the actual displacement value to an input end of the control apparatus; wherein
  the control apparatus comprises:
    a proportion integration differentiation (PID) controller and a voltage converter connected in series to the Pit) controller; wherein the PID controller is configured to:
      perform PID calculation according to the displacement error of the previous motnent; to obtain the control output value of the current moment;
      perform PID calculation to obtain the control output value of the current moment, when the displacement error of the previous moment is greater than a preset threshold; and
      perform PID calculation to obtain the control output value of the current moment, when the displacement error of the previous moment is less than the preset threshold; and wherein
    the voltage converter is configured to convert the control output value from to displacement value into the voltage signal, and transmit the voltage signal to the linear motor.
2. The electric current feedback signal based motor control system according to claim 1, wherein the HD controller is further configured to: determine whether the control output value of the current moment exceeds a limiting range after calculating the control output value of the current moment, and if yes, accumulate a deviation value to the control output value.

3. The electric current feedback signal based motor control system according to claim 2, wherein the limiting range comprises a positive deviation range and a negative deviation range; and the PID controller is configured to accumulate a negative deviation value to the control output value when the control output value exceeds the positive deviation range, and is further configured to accumulate a positive deviation value to the control output value when the control output value exceeds the negative deviation range.

4. The electric current feedback signal based motor control system according to claim 1, further comprising a prediction, compensator, wherein the prediction compensator is reversely connected in parallel to the control apparatus, and is configured to perform delay compensation on the displacement error of the previous moment that is input into the PID controller.

5. The electric current feedback signal based motor control system according to claim 4, wherein the prediction compensator is a Smith predictor.

6. The electric current feedback signal based motor control system according to claim 1, wherein the electric current feedback apparatus comprises:
an electric current sensor,
an analog to digital converter, and
a displacement converter;
the electric current sensor is connected to the linear motor, for measuring current values on two ends of the linear motor;
the analog to digital converter is connected to the electric current sensor, for converting an electrical signal of the electric current sensor into a digital signal; and
the displacement converter is connected to the analog to digital convertor, for converting the digital signal into the actual displacement value of the current moment.

7. A motor control method based on electric current feedback signal, applied to the motor control system based on electric current feedback signal according to claim 1, comprising:
calculating a displacement error of a previous moment to obtain a control output value of a current moment, and converting the control output value into a voltage signal for the linear motor to vibrate according to the voltage signal;
measuring an electric current value of the linear motor, and converting the electric current value into an actual displacement value of the current movement; and
feeding back the actual displacement value of the current moment to an input end.

* * * * *